US009910692B2

(12) United States Patent
Palermo et al.

(10) Patent No.: US 9,910,692 B2
(45) Date of Patent: Mar. 6, 2018

(54) ENHANCED VIRTUAL FUNCTION CAPABILITIES IN A VIRTUALIZED NETWORK ENVIRONMENT

(71) Applicant: Intel Corporation, Santa Clara, CA (US)

(72) Inventors: Stephen T. Palermo, Chandler, AZ (US); Scott P. Dubal, Beaverton, OR (US); Trevor Cooper, Portland, OR (US); Anjali S. Jain, Portland, OR (US); Iosif Gasparakis, Hillsboro, OR (US); Jr-Shian Tsai, Portland, OR (US); Mike Bursell, Halstead (GB); Pradeepsunder Ganesh, Chandler, AZ (US); Parthasarathy Sangam, Portland, OR (US); Jesse C. Brandeburg, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 45 days.

(21) Appl. No.: 15/006,320

(22) Filed: Jan. 26, 2016

(65) Prior Publication Data
US 2017/0212776 A1  Jul. 27, 2017

(51) Int. Cl.
*G06F 9/455* (2006.01)
*G06F 9/50* (2006.01)

(52) U.S. Cl.
CPC ........ *G06F 9/45558* (2013.01); *G06F 9/5011* (2013.01); *G06F 2009/45583* (2013.01); *G06F 2009/45595* (2013.01)

(58) Field of Classification Search
None
See application file for complete search history.

(56) References Cited

U.S. PATENT DOCUMENTS

2007/0089111 A1*  4/2007  Robinson ............... G06F 21/53
                                                     718/1
2007/0234334 A1  10/2007  Araujo, Jr. et al.
(Continued)

FOREIGN PATENT DOCUMENTS

WO      2014-011707 A1     1/2014

OTHER PUBLICATIONS

International Search Report and Written Opinion issued in PCT Application No. PCT/US2016/066149, dated Mar. 22, 2017, 14 pages.

*Primary Examiner* — Sisley Kim
(74) *Attorney, Agent, or Firm* — Grossman, Tucker, Perreault and Pfleger, PLLC (57) ABSTRACT

The present disclosure is directed to enhanced virtual function capabilities in a virtualized network environment. In general, devices may comprise physical and virtualized resources. The physical resources may comprise at least a network adaptor that may handle incoming data from a network and outgoing data to the network. The virtualized resources may comprise at least one virtual machine (VM) and a corresponding interface. The corresponding interface may be one of a physical interface, a virtual interface or a "super" virtual interface. The physical interface may provide a first set of capabilities allowing the VM to access (e.g., control) at least the network adaptor. The virtual interface may provide a second set of capabilities that is a subset of the first set. The super virtual interface may provide a third set of capabilities including the second set of capabilities and at least one additional capability from the first set of capabilities.

29 Claims, 4 Drawing Sheets

(56) References Cited

U.S. PATENT DOCUMENTS

| | | |
|---|---|---|
| 2010/0042994 A1 | 2/2010 | Vasilevsky et al. |
| 2013/0247056 A1* | 9/2013 | Hattori .................. G06F 9/5077 |
| | | 718/102 |
| 2015/0288618 A1 | 10/2015 | Jaisinghani et al. |

* cited by examiner

ENHANCED VIRTUAL FUNCTION CAPABILITIES IN A VIRTUALIZED NETWORK ENVIRONMENT

TECHNICAL FIELD

The present disclosure relates to data processing, and more particularly, to a system that may grant enhanced capabilities to virtual functions associated with virtual machines in a device.

BACKGROUND

Virtualization may be utilized in a device to subdivide physical processing resources into different "virtual" processing devices. Virtual machines (VM) may be loaded into the device to emulate the operation of standalone devices. VMs may operate collaboratively to perform a task or individually to perform a variety of different operations. For example, in certain virtualization architectures one VM may have access to control physical resources in a device (e.g., a network adapter), while other VMs may be provided with limited control features. This approach may be sufficient for cloud computing (e.g., including at least one server accessible via a network such as the Internet) wherein the operational focus may be primarily on data processing and storage. However, some applications such as virtual telecommunications company (Telco) networks may employ certain virtual network functions (VNFs) such as, for example, virtualized proxy servers, firewalls, routers, etc. The performance of these VNFs may benefit substantially from being able to directly access physical resource and configuration registers. Direct access may avoid latency that may be experienced when accessing these configurations via the host operating system (OS), thereby helping promote the use of standard servers within virtual networking environments such as Network Function Virtualization (NFV) or Software Defined Networking (SDN) scenarios.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

The present disclosure is directed to enhanced virtual function capabilities in a virtualized network environment. In general, devices may comprise physical and virtualized resources. The physical resources may comprise at least a network adaptor that may handle incoming data from a network and outgoing data to the network. The virtualized resources may comprise at least one virtual machine (VM) and a corresponding interface. The corresponding interface may be one of a physical interface, a virtual interface or a "super" virtual interface. The physical interface may provide a first set of capabilities allowing the VM to access (e.g., control) at least the network adaptor. The virtual interface may provide a second set of capabilities that is a subset of the first set. The super virtual interface may provide a third set of capabilities including the second set of capabilities and at least one additional capability selected from the first set of capabilities. In this manner, the capabilities of the super virtual interface may be customized based on, for example, the specific operations contemplated for the VM. A virtual machine manager (e.g., hypervisor) may control when new VMs are loaded and how additional capabilities are granted to the super virtual interface. In at least one embodiment, the hypervisor may determine whether a new VM is entitled to an additional capability based on, for example, a device security configuration.

In at least one embodiment, a device capable of virtualized operation may comprise, for example, at least physical resources, memory circuitry and processing circuitry. The physical resources may include at least a network adaptor. Virtualized resources may be loaded in the memory circuitry, the virtualized resources including at least VMs and interfaces corresponding to each of the VMs, the interfaces including a physical interface, a virtual interface and a super virtual interface. The processing circuitry may be to at least cause a VM and a corresponding physical interface, virtual interface or super virtual interface to be loaded into the memory circuitry as part of the virtualized resources.

In at least one embodiment, the network adaptor may be configured to operate utilizing single root input/output virtualization (SR-IOV). The physical interface may be to, for example, provide to the corresponding VM a first set of capabilities to control the network adaptor. The capabilities may include the ability to access at least one register in the device for controlling operation of at least the network adaptor. The virtual interface may be to, for example, provide to the corresponding VM a second set of capabilities that is a subset of the capabilities included in the first set. The super virtual interface may be to, for example, provide to the corresponding VM a third set of capabilities including the second set of capabilities and at least one additional capability included in the first set.

In at least one embodiment, the processing circuitry may be to cause a virtual machine manager (VMM) to be loaded into the memory circuitry. The VMM may be to determine that a VM is to be loaded into the memory circuitry. The VMM may further be to determine whether to load a physical interface, virtual interface or super virtual interface. In determining to load the super virtual interface, the VMM may be to determine at least one additional capability. In determining the at least one additional capability, the VMM may be to determine whether the VM is allowed to access the at least one additional capability based on a security configuration. Consistent with the present disclosure, a method for virtualized operation may comprise, for example, determining that a VM is to be loaded into memory circuitry in a device, determining at least one of a physical interface, a virtual interface or a super virtual interface to be loaded corresponding to the VM, the physical interface, virtual interface or super virtual interface allowing the VM to access a network adaptor in the device, and loading the VM and the determined at least one of the physical interface, virtual interface or super virtual interface into the memory circuitry.

Figure 1:
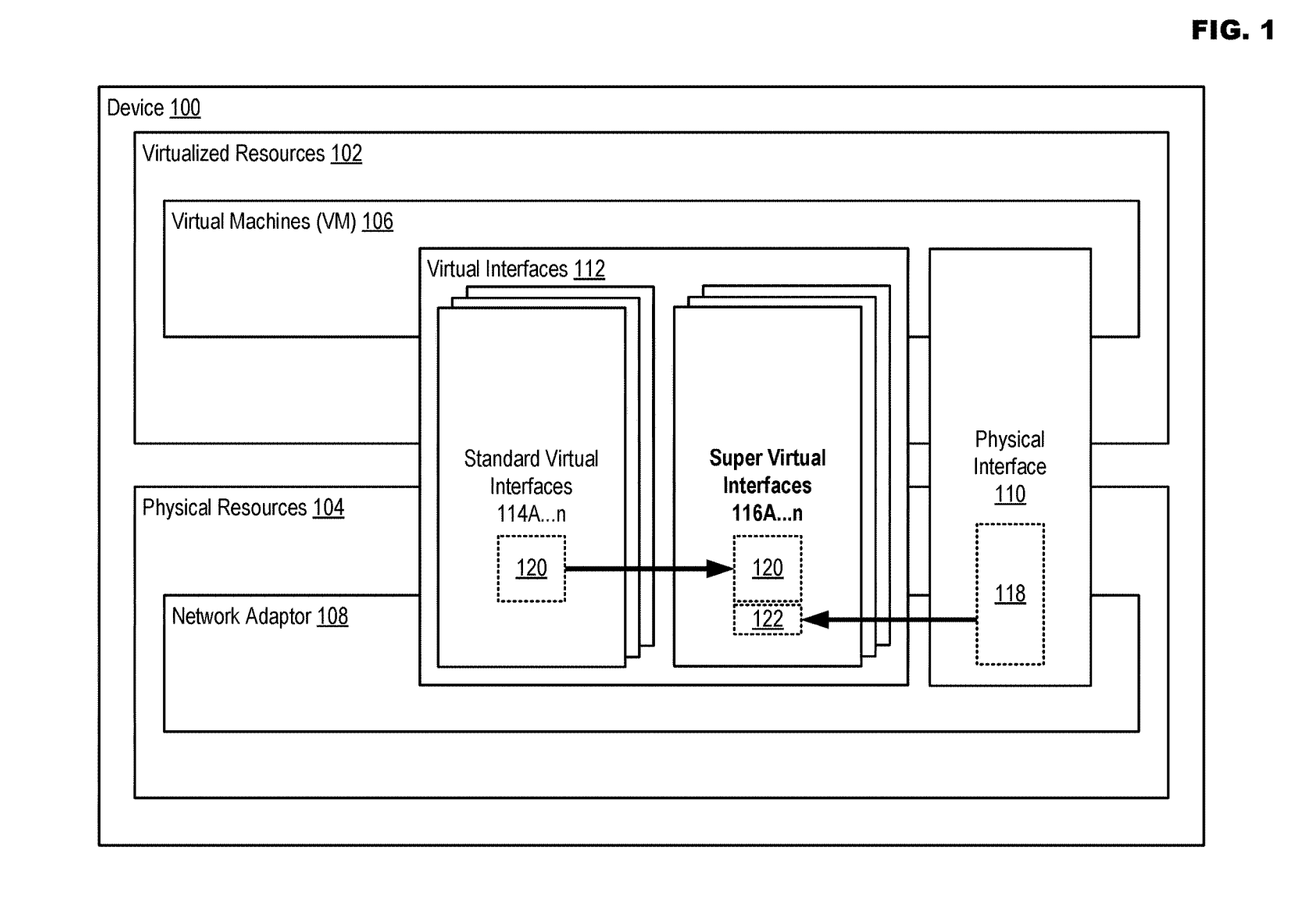
FIG. 1 illustrates an example system including enhanced virtual function capabilities in a virtualized network environment in accordance with at least one embodiment of the present disclosure.

FIG. 1 illustrates an example system including enhanced virtual function capabilities in a virtualized network environment in accordance with at least one embodiment of the present disclosure. Initially, the following may make reference to, or may use terminology commonly associated with, certain technologies for controlling the flow of data to and/or from a network such as, for example, Virtual Machine Device queues (VMDq) and SR-IOV developed by the Intel Corporation. These examples are offered merely for the sake of explanation, and are not intended to limit embodiments consistent with the present disclosure to any particular manner of implementation. While these technologies provide a basis for understanding the embodiments, actual implementations may utilize other technologies existing now or developed in the future. Moreover, the inclusion of an apostrophe after a drawing item number (e.g., 100') in the present disclosure may indicate that an example embodiment of the particular item is being illustrated.

As referenced herein, VMDq and SR-IOV are technologies that improve performance in a device by more directly routing data received from sources outside of the device via a network adaptor to a particular destination VM. In older architectures at least one data processor (e.g., at least one core in a microprocessor) was responsible for determining the destination for incoming data, which proved to be a bottleneck. In VMDq different queues having different interrupts are used to sort data for each data processor, and each data processor is then responsible for routing the data in the queue. However, VMDq still requires at least a VMM (e.g., hypervisor) to touch (e.g., copy) each piece of data in each queue. SR-IOV introduced direct memory access (DMA) to the queue-based scheme of VMDq so that incoming data may be transferred directly from a particular queue into the memory of a destination VM. In this manner, SR-IOV allows incoming data to be transferred to target VMs without significant interruptions to ongoing data processing. SR-IOV may utilize various types of interfaces (e.g., "functions" when implementing SR-IOV) to enable VMs to interact with various physical resources (e.g., a network adaptor). The various embodiments disclosed herein introduce a new function that may enable certain VMs to perform specialized duties by making new capabilities available.

An example device 100 is shown in FIG. 1. Device 100 may comprise a single apparatus or a group of apparatuses that, while having similar or different configurations, may still operate in a collaboratively manner to perform various operations associated with device 100. Examples of device 100 may include, but are not limited to, a mobile communication device such as a cellular handset or a smartphone based on the Android® OS from the Google Corporation, iOS® or Mac OS® from the Apple Corporation, Windows® OS from the Microsoft Corporation, Tizen® OS from the Linux Foundation, Firefox® OS from the Mozilla Project, Blackberry® OS from the Blackberry Corporation, Palm® OS from the Hewlett-Packard Corporation, Symbian® OS from the Symbian Foundation, etc., a mobile computing device such as a tablet computer like an iPad® from the Apple Corporation, Surface® from the Microsoft Corporation, Galaxy Tab® from the Samsung Corporation, Kindle® from the Amazon Corporation, etc., an Ultrabook® including a low-power chipset from the Intel Corporation, a netbook, a notebook, a laptop, a palmtop, etc., a wearable device such as a wristwatch form factor computing device like the Galaxy Gear® from Samsung, an eyewear form factor computing device/user interface like Google Glass® from the Google Corporation, a virtual reality (VR) headset device like the Gear VR® from the Samsung Corporation, the Oculus Rift® from the Oculus VR Corporation, etc., a typically stationary computing device such as a desktop computer, server, a group of computing devices in a high performance computing (HPC) architecture, a smart television or other "smart" device, small form factor computing solutions (e.g., for space-limited applications, TV set-top boxes, etc.) like the Next Unit of Computing (NUC) platform from the Intel Corporation, etc.

As illustrated in FIG. 1, device 100 may generally comprise at least virtualized resources 102 and physical resources 104. Virtualized resources 102 may include, for example, programs, applications, utilities, code, instructions, data, etc. that, upon be loaded into device 100, emulate hardware-based features of device 100. VM 106 may be an example of virtualized resources 102 in that each VM 106 may emulate the operation of an individual data processing device in device 100. Each VM 106 may, for example, be assigned a different role in device 100 such as to act as a hypervisor, firewall, router, an operational environment in which an OS executes, etc. Physical resources 104 may include actual equipment in device 100. Network adaptor 108 is an example of physical resources 104. Network adaptor 108 may include a network interface card (NIC) and other functionality related to routing data between device 100 and a network such as a global-area network (GAN), wide-area network (WAN) like the Internet, local area network (LAN), etc.

An interface may be loaded corresponding to each VM 106 to allow VM 106 to interact with physical resources 104. Different types of interfaces may comprise different "capabilities" that, for example, allow VMs 106 to control the operation of network adaptor 108. Capabilities, as referenced herein, may include granting VMs 106 access to various registers for configuring network adaptor 108. In at least one embodiment, the interfaces may include physical interface 110 and one or more virtual interfaces 112. Physical interface 110 may, for example, comprise a set of capabilities 118 that grants full control over network adaptor 108 to a VM 106. Consistent with the present disclosure, only one instance of physical interface 110 may be active at a time to avoid network adaptor 108 receiving conflicting configurations from different VMs 106. Virtual interfaces 112 may include, for example, one or more standard virtual interfaces 114A . . . n, also identified herein simply as "virtual interfaces 114A . . . n", and one or more super virtual interfaces 116A . . . n. Virtual interfaces 114A . . . n may comprise subset 120 of the full set of capabilities 118 available in physical interface 110. For example, a VM 106 may be loaded with a corresponding virtual interface 114A . . . n. Subset 120 in the virtual interface 114A . . . n may allow the VM 106 to at least configure the delivery of incoming data intended for the VM 106 (e.g., to configure the address of the memory space to which to DMA the data as in SR-IOV) in network adaptor 108.

As illustrated in FIG. 1, super virtual interfaces 116A . . . n may comprise at least subset 120 and at least one additional capability 122 taken from the full set of capabilities 118 available to physical interface 110. In at least one embodiment, the VMM may determine upon loading a VM 106 whether subset 120 will be sufficient or whether at least one additional capability 122 will be needed for the VM 106 to perform its intended function. For example, if the VM 106 to be loaded is intended to act as a firewall it may be advantageous to grant the VM 106 access to data flow control capabilities not included in subset 120. In this manner, the capabilities of super virtual interfaces 116A . . . n may be custom fit based on the intended operation of a corresponding VM 106. While this type of operation appears beneficial on its face, it also introduces the ability to build powerful VMs 106 that could be used to compromise the integrity of device 100 or other devices on the network, gain access to data within device 100 or other devices on the network, etc. In at least one embodiment, device 100 may further comprise a security configuration that checks whether a VM 106 to be loaded is entitled to utilize additional capability 122. The VMM may utilize the security configuration to determine and/or control which VMs 106 are allowed to load corresponding super virtual interfaces 116A . . . n (e.g., based on intended purpose, task, etc.), which additional capabilities 122 are available for use with super virtual interfaces 116A . . . n, etc.

Figure 2:
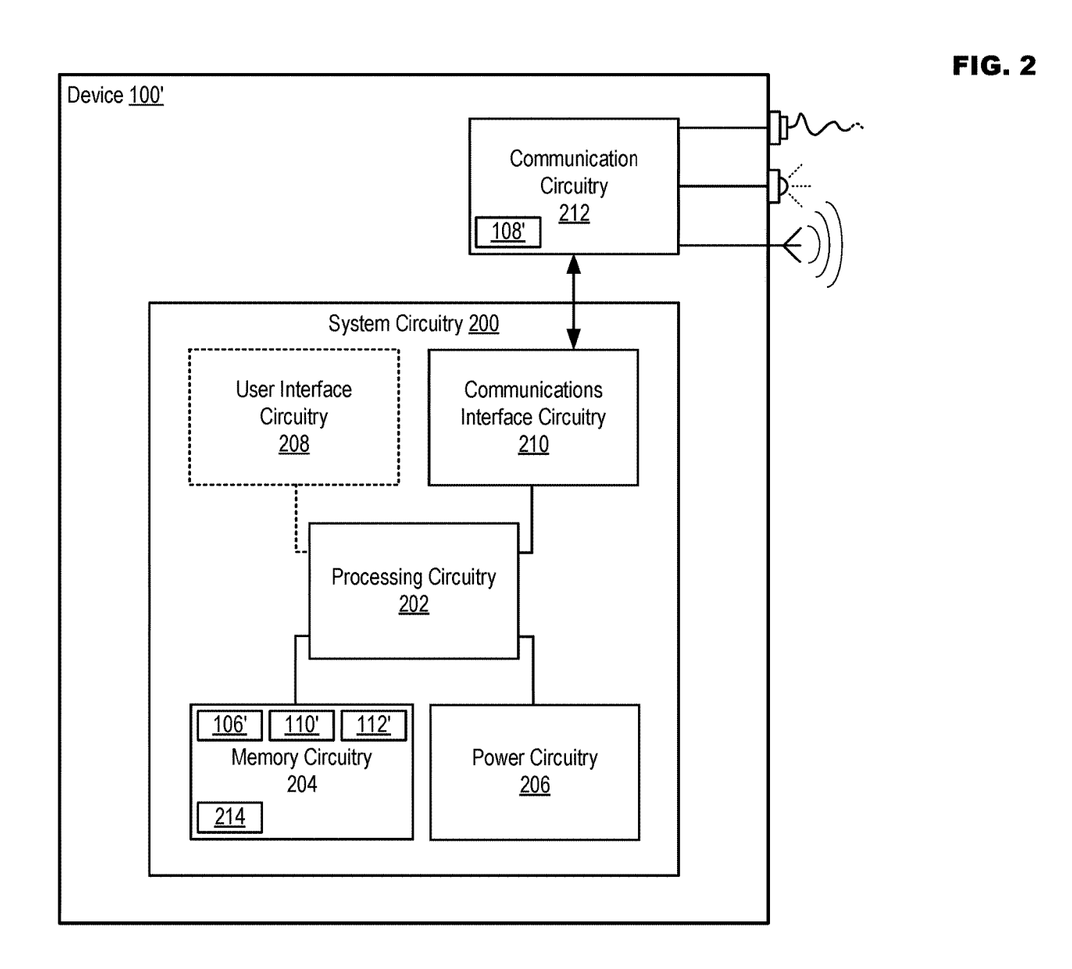
FIG. 2 illustrates an example configuration for a device usable in accordance with at least one embodiment of the present disclosure.

FIG. 2 illustrates an example configuration for a system usable in accordance with at least one embodiment of the present disclosure. For example, device 100' may be capable of performing any or all of the activities disclosed in FIG. 1. However, device 100' is presented only as an example of an apparatus usable in embodiments consistent with the present disclosure, and is not intended to limit any of the embodiments disclosed herein to any particular manner of implementation. Moreover, while depicted as only one apparatus, device 100' may also be made up of multiple apparatuses configured to operate collaborative to perform the activities of FIG. 1.

System circuitry 200 may manage the operation of device 100'. System circuitry 200 may comprise, for example, processing circuitry 202, memory circuitry 204, power circuitry 206, user interface circuitry 208 and communication interface circuitry 210. Device 100' may further include communication circuitry 212. While communication circuitry 212 is shown as separate from system circuitry 200, device 100' is provided in FIG. 2 merely for the sake of explanation in regard to various embodiments. Variations are possible including, for example, some or all of the functionality of communication circuitry 212 being incorporated into system circuitry 200.

In device 100', processing circuitry 202 may comprise one or more processors situated in separate components, or alternatively one or more processing cores in a single component (e.g., in a System-on-a-Chip (SoC) configuration), along with processor-related support circuitry (e.g., bridging interfaces, etc.). Example processors may include, but are not limited to, various x86-based microprocessors available from the Intel Corporation including those in the Pentium, Xeon, Itanium, Celeron, Atom, Quark, Core i-series, Core M-series product families, Advanced RISC (e.g., Reduced Instruction Set Computing) Machine or "ARM" processors, etc. Examples of support circuitry may include chipsets (e.g., Northbridge, Southbridge, etc. available from the Intel Corporation) to provide an interface through which processing circuitry 202 may interact with other system components that may be operating at different speeds, on different buses, etc. in device 100'. Moreover, some or all of the functionality commonly associated with the support circuitry may also be included in the same package as the processor (e.g., such as in the Sandy Bridge, Broadwell and Skylake families of processors available from the Intel Corporation).

Processing circuitry 202 may be configured to execute various instructions in device 100'. Instructions may include program code configured to cause processing circuitry 202 to perform activities related to reading data, writing data, processing data, formulating data, converting data, transforming data, etc. Information (e.g., instructions, data, etc.) may be stored in memory circuitry 204. Memory circuitry 204 may comprise random access memory (RAM) and/or read-only memory (ROM) in a fixed or removable format. RAM may include volatile memory configured to hold information during the operation of device 100' such as, for example, static RAM (SRAM) or Dynamic RAM (DRAM). ROM may include non-volatile (NV) memory circuitry configured based on BIOS, UEFI, etc. to provide instructions when device 100' is activated, programmable memories such as electronic programmable ROMs (EPROMS), Flash, etc. Other examples of fixed/removable memory may include, but are not limited to, magnetic memories such as hard disk (HD) drives, electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), Digital Video Disks (DVD), Blu-Ray Disks, etc.

Power circuitry 206 may include, for example, internal power sources (e.g., a battery, fuel cell, etc.) and/or external power sources (e.g., electromechanical or solar generator, power grid, external fuel cell, etc.), and related circuitry configured to supply device 100' with the power needed to operate. User interface circuitry 208 may include hardware and/or software to allow users to interact with device 100' such as, for example, various input mechanisms (e.g., microphones, switches, buttons, knobs, keyboards, speakers, touch-sensitive surfaces, one or more sensors configured to capture images, video and/or sense proximity, distance, motion, gestures, orientation, biometric data, etc.) and various output mechanisms (e.g., speakers, displays, lighted/flashing indicators, electromechanical components for vibration, motion, etc.). The hardware in user interface circuitry 208 may be incorporated within device 100' and/or may be coupled to device 100' via a wired or wireless communication medium. At least some user interface circuitry 208 may be optional in certain circumstances such as, for example, a situation wherein device 100' is a very space-limited form factor device, a server (e.g., rack server, blade server, etc.), etc. that does not include user interface circuitry 208, and instead relies on another device (e.g., a management terminal) for user interface functionality.

Communication interface circuitry 210 may be configured to manage packet routing and other control functions for communication circuitry 212, which may include resources configured to support wired and/or wireless communications. In some instances, device 100' may comprise more than one set of communication circuitry 212 (e.g., including separate physical interface circuitry for wired protocols and/or wireless radios) managed by centralized communication interface circuitry 210. Wired communications may include serial and parallel wired mediums such as, for example, Ethernet, USB, Firewire, Thunderbolt, Digital Video Interface (DVI), High-Definition Multimedia Interface (HDMI), etc. Wireless communications may include, for example, close-proximity wireless mediums (e.g., radio frequency (RF) such as based on the RF Identification (RFID) or Near Field Communications (NFC) standards, infrared (IR), etc.), short-range wireless mediums (e.g., Bluetooth, WLAN, Wi-Fi, etc.), long range wireless mediums (e.g., cellular wide-area radio communication technology, satellite-based communications, etc.), electronic communications via sound waves, etc. In one embodiment, communication interface circuitry 210 may be configured to prevent wireless communications that are active in communication circuitry 212 from interfering with each other. In performing this function, communication interface circuitry 210 may schedule activities for communication circuitry 212 based on, for example, the relative priority of messages awaiting transmission. While FIG. 2 illustrates communication interface circuitry 210 and communication circuitry 212 as separate, it may also be possible for the functionality of communication interface circuitry 210 and communication circuitry 212 to be combined in the same circuitry.

Consistent with the present disclosure, virtualized resources 102 including, for example, at least VMs 106' physical interface 110' and virtual interfaces 112' may be loaded in memory circuitry 204. In particular, program code, data, etc. stored in a non-volatile memory in memory circuitry 204 may be loaded into volatile memory in memory circuitry 204 and then executed by processing circuitry 202 to transform processing circuitry 202 from general data processing circuitry into specialized circuitry that may be configured to at least perform operations such as discussed with respect to FIG. 1. Moreover, network adaptor 108' may comprise a component, components (e.g., in a chipset), an SoC, a multi-chip module, a plug-in module, a plug-in card, an external peripheral device, etc. in communication circuitry 212. In an example of operation, VM 106' and corresponding interfaces 110' or 112' may be loaded in memory circuitry 204. VM 106' may then interact with network adaptor 108' via interfaces 110' or 112' to control certain aspects of the operation of network adaptor 108' (e.g., to at least cause incoming data received through network adaptor 108' to be delivered to VM 106'). Memory Circuitry 204 may also comprise VMM 214 to load VM 106', physical interface 110' and/or virtual interfaces 112', to control the operation of VM 106', physical interface 110' and/or virtual interfaces 112', etc.

Figure 3:
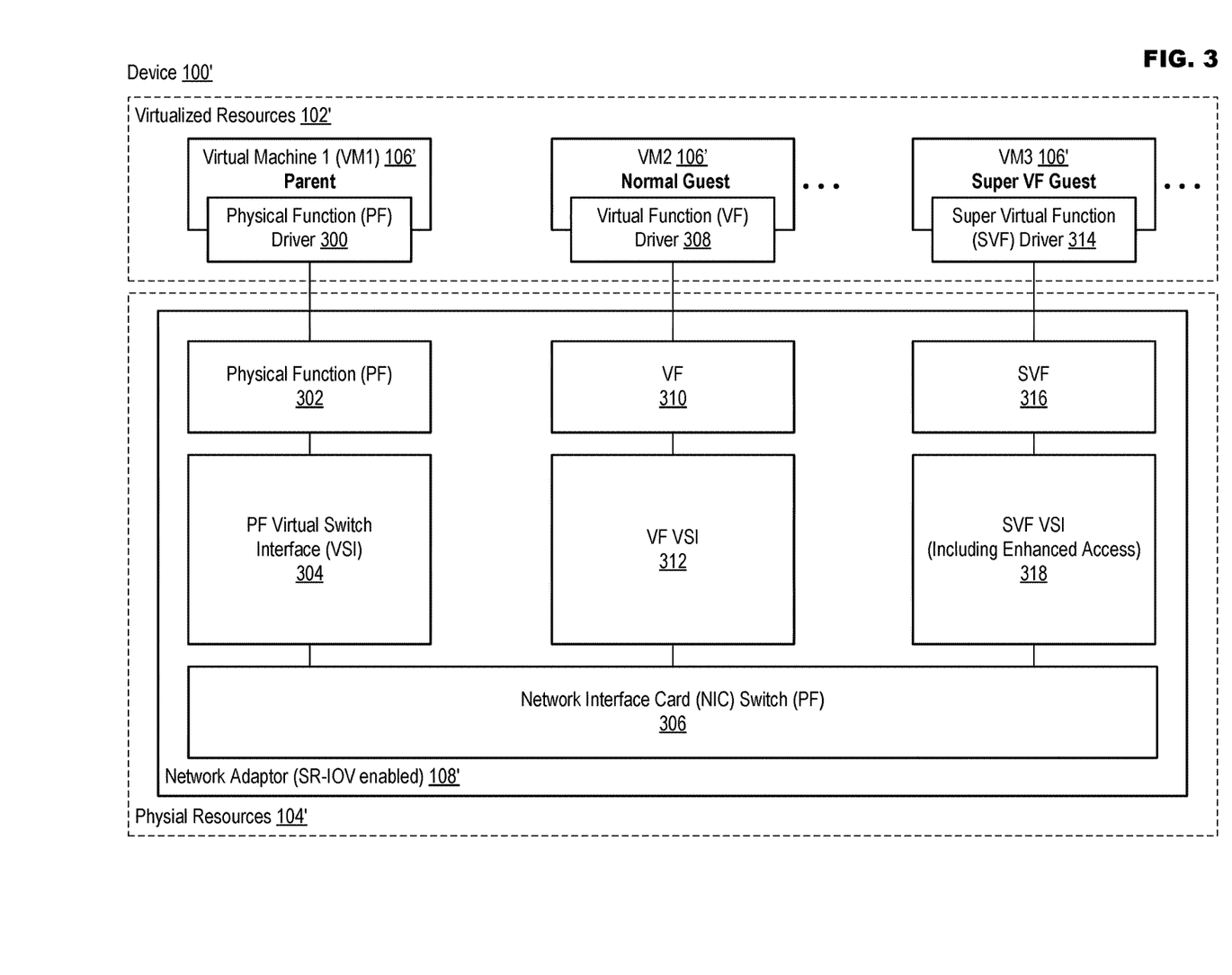
FIG. 3 illustrates an example implementation of a system including enhanced virtual function capabilities in a virtualized network environment in accordance with at least one embodiment of the present disclosure.

FIG. 3 illustrates an example implementation of a system including enhanced virtual function capabilities in a virtualized network environment in accordance with at least one embodiment of the present disclosure. The example implementation of device 100' in FIG. 3 demonstrates how the functionality described in FIG. 1 may be implemented in accordance with SR-IOV operation. For example, "interfaces" as generally referenced herein may be referred to "functions" in SR-IOV implementations. Three example VMs 106' are shown in FIG. 3. The first VM (VM1) 106' loaded in virtualized resources 102' has been loaded along with a physical function (PF) driver 300 to control the operation of SR-IOV enabled network adaptor 108' in physical resources 104'. PF driver 300 300 may allow VM1 106' to control PF 302, which in turn may control PH virtual switch interface (VSI) 304, for controlling the general operation of NIC switch 306. The second VM (VM2) 106' is to demonstrate an example implementation for a virtual interface 114A . . . n. Virtual function (VF) driver 308 may be loaded corresponding to the loading of VM2 106' to allow VM2 106' to control VF 310, and in turn VF VSI 312, for interacting with NIC switch 306. VM2 may utilize VF driver 308 to configure VF 310 and VF VSI for delivering data (e.g., packets) from NIC switch 306 to VM2 106' via DMA (e.g., at least the address for a memory space used by VM2 106' may be provided as a destination for delivering incoming data). The third VM (VM3) 106' is to demonstrate an example implementation for super virtual interface 116A . . . n. A super virtual function (SVF) driver 314 may be loaded corresponding to the loading of VM3 106' to allow VM3 106' to control SVF 316, and in turn SVF VSI 318 (e.g., including enhanced access), to interact with NIC switch 306. While VM3 106' may utilize SVF driver 314 to configure SVF 316 and/or SVF VSI 318 for the delivery of data received by network adaptor 108', at least one additional capability 122 granted to SVF 316 may allow VM3 to perform at least one other control activity at least related to the operation of network adaptor 108'.

SR-IOV extends the PCI Express (PCIe) specification to allow network adapters 108' to appear as multiple devices. In this manner, SR-IOV essentially allows network traffic to bypass VM 106' switching software, and as a result reduces the I/O overhead associated with virtual networks. Both PFs 302 and VFs 310 are used by SR-IOV to manage global functions used by SR-IOV devices. However, per PCIe only PFs 302 have full access to configure and control a PCIe device. Only PF 302 is allowed to configure SR-IOV devices (e.g., network adaptor 108'), which results in long VM-EXIT latencies that are unacceptable for applications that require fast packet processing. Consistent with the present disclosure, some of the critical aspects of PF 302 are virtualized along with the software architecture necessary to allow VMs 106' to obtain direct access to the PF resources. More powerful VF capabilities are enabled up to and including most PF capabilities utilizing SR-IOV capable network adapter 108', which may grant to certain users such as, for example, original equipment manufacturers (OEMs) desired access, control, etc.

A practical embodiment may include extending the boundaries of network interface card (NIC) hardware registers to allow for a number of (e.g., sixteen) SVFs 316 that may have access to more registers than a VF 310 (but not all of the capabilities of PF 302) available on an SR-IOV capable I/O device without impacting other VF registers. More specifically, SVF 316 may co-exist with existing VF 310 allowing, for example, telco service providers more flexibility in managing their networks. SVFs 316 may be controlled by network function virtualization (NFV) orchestrators allowing network operators, cloud service providers, etc. access to further features that are typically constrained to only those VMs 106' having privileged PF 302 capabilities. A mechanism to provision SVF 316 (e.g., perhaps in an integrated NIC) may be to use a Chipset Manageability Engine (CME) via a baseboard management console (BMC). This approach may help provide another method to gain BMC-level access (e.g., to address a security issue directly with a particular VM 106' using the flow director).

Examples of capabilities that may currently be available to VF 310 in existing SR-IOV-enabled devices (e.g., network adaptor 108') include, for example, Limited Independent interrupt vectors (e.g., as dictated by hardware), Limited VF-PF Queue-pairs (e.g., as dictated by HW wherein an upper limit is less than the PF queue pairs), Limited Receive Side Scaling (RSS) load balancing, Limited MAC VLAN filters (up to PF max allowed per VF) and Limited untrusted VF-mode (e.g., prevents promiscuous-mode). Consistent with the present disclosure, examples of additional capabilities 122 that may be available to SVF 316 may include, but are not limited to, a queue assignment mechanism for packets such as, for example, Ethernet Flow Director technology developed by the Intel Corporation wherein an out-of-band (OOB) pathway may be added through management resources or a Manageability Engine (ME), an ability to program NIC switch 306, an ability to block updates from a PF propagating to other VF's without a VF reset, Control Filter Configuration (e.g., Ethertype filters, Cloud filters, L3 VEB filters, Mac-VLAN filters, etc.), a Virtual Switch Interface (Promiscuous-mode), Mirroring for specific VSIs ingress-egress traffic, Application Target routing, Tunnel End point Offload, Add Virtual Ethernet Bridge (VEB), Enable different Switch topology with cascaded/floating VEBs, Larger RSS LUT footprint and number of PF queues to do RSS, Packet monitoring and statistics, etc.

In at least one embodiment, network adaptor 108' may advertise to the OS of device 100' a capability list including all the functions that SVFs 316 can perform. VMM 214 may request a new virtual function and access to none, one, several additional capabilities 122. Requesting no additional capabilities 122 would be a standard VF 310, while requesting at least one additional capability 122 would result in SVF 316. A reason for allowing a VF more functionality may be based on, for example, the need for a VM to offload part or all of its software functionality. For example, VMM 214 may spawn a VM 106' with a purpose of "firewalling" other VMs from the physical network. In that instance, VMM 214 may request access to Flow Director programming as an additional capability 122 so VM 106' is able to allow some flows or drop in the hardware some others. When the firewall runs inside a VM 106', it may use the Flow Director the same way it could as if it was running in PF 302 (e.g. provided that the driver is aware). For this the VMM needs to also be aware of the capability list that the network adaptor 108' advertises. In at least one embodiment, a benefit may be realized in that the cores in processing circuitry 202 may have more bandwidth to process the applications and/or VMs 106' instead of processing packets, improving the overall Quality of Experience (QoE) for the user. Also, the absence of a vSwitch running in VMM 214 conserves more cycles and reduces possible cache thrashing to other cores.

Figure 4:
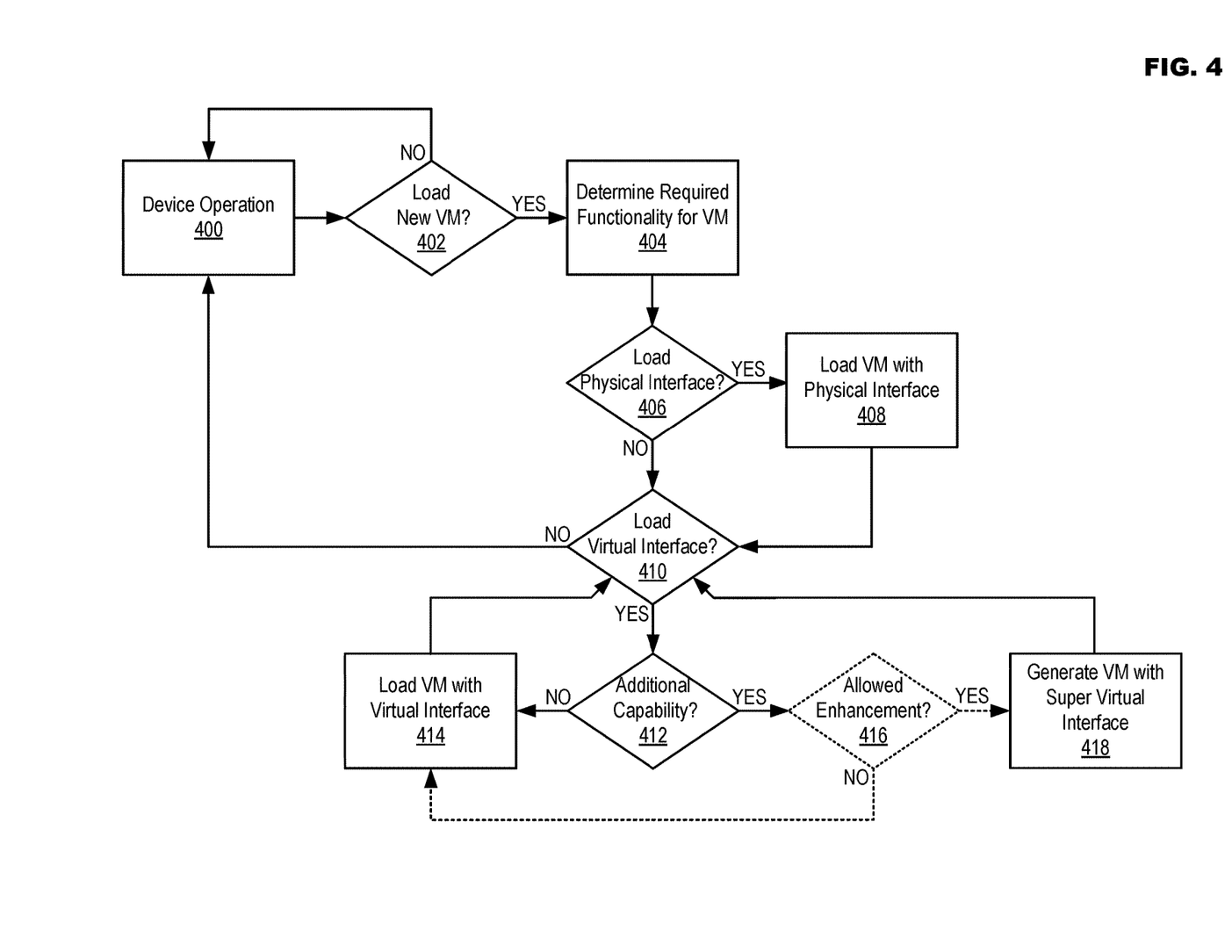
FIG. 4 illustrates example operations for virtualized operation in accordance with at least one embodiment of the present disclosure.

FIG. 4 illustrates example operations for virtualized operation in accordance with at least one embodiment of the present disclosure. Operations illustrated with an illustrated outline may be optional in that their inclusion may be implementation-dependent (e.g., based on the ability of the hardware/software, the intended end-use, etc.). A device may continue to operate as shown in operation 400 until a determination is made in operation 402 that a new VM is to be loaded. The determination made in operation 402 to load a new VM may be followed by determination in operation 404 of the functionality required for the new VM. For example, the functionality may be based on the intended task to be handled by the new VM (e.g., firewalling, data routing, acting as an operational environment for an OS, etc.). A determination may then be made in operation 406 as to whether a physical interface is to be loaded for the new VM. If in operation 408 it is determined that a physical interface is to be loaded, then in operation 408 the new VM may be loaded with a corresponding physical interface.

Following operation 408 or a determination in operation 406 that a physical interface is not to be loaded, a further determination may then be made in operation 410 as to whether at least one virtual interface is to be loaded for the new VM. A determination in operation 410 that at least one virtual interface is not to be loaded may be followed by a return to operation 400 to continue with normal device operation. If in operation 410 it is determined that at least one virtual interface is to be loaded, then in operation 412 a further determination may be made as to whether the new VM will require enhanced functionality (e.g., at least one additional capability above that included in the set of capabilities available in a standard virtual interface). If in operation 412 a determination is made that no additional capabilities will be required, then in operation 414 a VM may be loaded with a corresponding standard virtual interface. Operation 414 may be followed by a return to operation 410 to determine whether additional virtual interfaces need to be loaded for the VM. If in operation 412 it is determined that at least one additional capability will be required, then optionally in operation 416 a further determination may be made as to whether the enhancement is allowed (e.g., whether the new VM is allowed to utilize the at least one additional capability). This determination may be made based on, for example, a security configuration in the device. A determination in operation 416 that the enhancement is not allowed may be followed by a return to operation 414 to load a standard virtual interface. If in operation 416 it is determined that the enhancement is allowed, then in operation 418 the new VM may be loaded with the corresponding super virtual interface (e.g., including the at least one additional capability). Operation 416 may be followed by a return to operation 410 to determine whether additional virtual interfaces need to be loaded for the VM.

While FIG. 4 illustrates operations according to an embodiment, it is to be understood that not all of the operations depicted in FIG. 4 are necessary for other embodiments. Indeed, it is fully contemplated herein that in other embodiments of the present disclosure, the operations depicted in FIG. 4, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., non-volatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software circuitry executed by a programmable control device.

Thus, the present disclosure is directed to enhanced virtual function capabilities in a virtualized network environment. In general, devices may comprise physical and virtualized resources. The physical resources may comprise at least a network adaptor that may handle incoming data from a network and outgoing data to the network. The virtualized resources may comprise at least one virtual machine (VM) and a corresponding interface. The corresponding interface may be one of a physical interface, a virtual interface or a "super" virtual interface. The physical interface may provide a first set of capabilities allowing the VM to access (e.g., control) at least the network adaptor. The virtual interface may provide a second set of capabilities that is a subset of the first set. The super virtual interface may provide a third set of capabilities including the second set of capabilities and at least one additional capability from the first set of capabilities.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a system for API monitoring bypass prevention.

According to example 1 there is provided a device capable of virtualized operation. The device may comprise physical resources including at least a network adaptor, memory circuitry in which virtualized resources are loaded, the virtualized resources including virtual machines and interfaces corresponding to each of the virtual machines, the interfaces including a physical interface, a virtual interface and a super virtual interface and processing circuitry to at least cause a virtual machine and a corresponding physical interface, virtual interface or super virtual interface to be loaded into the memory circuitry as part of the virtualized resources.

Example 2 may include the elements of example 1, wherein the network adaptor is configured to operate utilizing single root input/output virtualization (SR-IOV).

Example 3 may include the elements of example 2, wherein in SR-IOV the physical interface is a physical function (PF), the virtual interface is a virtual function (VF) and the super virtual interface is a super virtual function (SVF).

Example 4 may include the elements of example 3, wherein the virtual machine comprises at least one of a PF driver, a VF driver or a SVF driver to interact with at least one of the PF, the VF or the SVF.

Example 5 may include the elements of any of examples 3 to 4, wherein the PF, the VF and the SVF are loaded into the network adaptor.

Example 6 may include the elements of example 5, wherein the network adaptor comprises a PF virtual switch interface (VSI) to provide an interface between the physical function and a network interface card (NIC) switch in the network adaptor, a VF VSI to provide an interface between the VF and the NIC switch, and a SVF VSI to provide an interface between the SVF and the NIC switch.

Example 7 may include the elements of any of examples 1 to 6, wherein the physical interface is to provide to the corresponding virtual machine a first set of capabilities to control the network adaptor.

Example 8 may include the elements of example 7, wherein the capabilities include the ability to access at least one register in the device for controlling operation of at least the network adaptor.

Example 9 may include the elements of any of examples 7 to 8, wherein the virtual interface is to provide to the corresponding virtual machine a second set of capabilities that is a subset of the capabilities included in the first set.

Example 10 may include the elements of example 9, wherein the super virtual interface is to provide to the corresponding virtual machine a third set of capabilities including the second set of capabilities and at least one additional capability included in the first set.

Example 11 may include the elements of any of examples 1 to 10, wherein the processing circuitry is to cause a virtual machine manager to be loaded into the memory circuitry.

Example 12 may include the elements of example 11, wherein the virtual machine manager is to determine that a virtual machine is to be loaded into the memory circuitry.

Example 13 may include the elements of example 12, wherein the virtual machine manager is to determine whether to load a physical interface, virtual interface or super virtual interface.

Example 14 may include the elements of example 13, wherein in determining to load the super virtual interface the virtual machine manager is to determine at least one additional capability.

Example 15 may include the elements of example 14, wherein in determining the at least one additional capability the virtual machine manager is to determine whether the virtual machine is allowed to access the at least one additional capability based on a security configuration.

Example 16 may include the elements of any of examples 1 to 15, wherein the processing circuitry is to cause a virtual machine manager to be loaded into the memory circuitry, wherein the virtual machine manager is to determine that a virtual machine is to be loaded into the memory circuitry and whether to load a physical interface, virtual interface or super virtual interface.

According to example 17 there is provided a method for virtualized operation. The method may comprise determining that a virtual machine is to be loaded into memory circuitry in a device, determining at least one of a physical interface, a virtual interface or a super virtual interface to be loaded corresponding to the virtual machine, the physical interface, virtual interface or super virtual interface allowing the virtual machine to access a network adaptor in the device and loading the virtual machine and the determined at least one of the physical interface, virtual interface or super virtual interface into the memory circuitry.

Example 18 may include the elements of example 17, wherein the physical interface provides to the corresponding virtual machine a first set of capabilities to control the network adaptor.

Example 19 may include the elements of example 18, wherein the capabilities include the ability to access at least one register in the device for controlling operation of at least the network adaptor.

Example 20 may include the elements of any of examples 18 to 19, wherein the virtual interface provides to the corresponding virtual machine a second set of capabilities that is a subset of the capabilities included in the first set.

Example 21 may include the elements of example 20, wherein the super virtual interface provides to the corresponding virtual machine a third set of capabilities including the second set of capabilities and at least one additional capability included in the first set.

Example 22 may include the elements of example 21, and may further comprise determining the at least one additional capability when it is determined that a super virtual interface is to be loaded.

Example 23 may include the elements of example 22, and may further comprise determining whether the virtual machine is allowed to access at least one additional capability based on a security configuration in the device.

Example 24 may include the elements of any of examples 17 to 23, wherein two or more interfaces are loaded for a single virtual machine.

According to example 25 there is provided a system including at least one device, the system being arranged to perform the method of any of the above examples 17 to 24.

According to example 26 there is provided a chipset arranged to perform the method of any of the above examples 17 to 24.

According to example 27 there is provided at least one machine readable medium comprising a plurality of instructions that, in response to be being executed on a computing device, cause the computing device to carry out the method according to any of the above examples 17 to 24.

According to example 28 there is provided at least one device capable of virtualized operation, the at least one device being arranged to perform the method of any of the above examples 17 to 24.

According to example 29 there is provided a system for virtualized operation. The system may comprise means for determining that a virtual machine is to be loaded into memory circuitry in a device, means for determining at least one of a physical interface, a virtual interface or a super virtual interface to be loaded corresponding to the virtual machine, the physical interface, virtual interface or super virtual interface allowing the virtual machine to access a network adaptor in the device and means for loading the virtual machine and the determined at least one of the physical interface, virtual interface or super virtual interface into the memory circuitry.

Example 30 may include the elements of example 29, wherein the physical interface is to provide to the corresponding virtual machine a first set of capabilities to control the network adaptor.

Example 31 may include the elements of example 30, wherein the capabilities include the ability to access at least one register in the device for controlling operation of at least the network adaptor.

Example 32 may include the elements of any of examples 30 to 31, wherein the virtual interface is to provide to the corresponding virtual machine a second set of capabilities that is a subset of the capabilities included in the first set.

Example 33 may include the elements of example 32, wherein the super virtual interface is to provide to the corresponding virtual machine a third set of capabilities including the second set of capabilities and at least one additional capability included in the first set.

Example 34 may include the elements of example 33, and may further comprise means for determining the at least one additional capability when it is determined that a super virtual interface is to be loaded.

Example 35 may include the elements of example 34, and may further comprise means for determining whether the virtual machine is allowed to access at least one additional capability based on a security configuration in the device.

Example 36 may include the elements of any of examples 29 to 35, wherein two or more interfaces are loaded for a single virtual machine.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A device capable of virtualized operation, comprising:
   physical resources including at least a single root input/output virtualization (SR-IOV)-enabled network adaptor;
   memory circuitry in which an operating system and virtualized resources are loaded, the virtualized resources including virtual machines and interfaces corresponding to each of the virtual machines, the interfaces including a physical interface, a virtual interface and a super virtual interface; and
   processing circuitry to at least cause a first virtual machine and a corresponding physical function driver having the physical interface to be loaded into the memory circuitry to control the SR-IOV network adaptor, a second virtual machine to be loaded into the memory circuitry as a virtual function driver for the virtual interface and a third virtual machine to be loaded into the memory circuitry as a super function driver for the super virtual interface, wherein the SR-IOV network adaptor is configurable to advertise to the operating system a capability list including at least one capability available to the virtual machine through the super virtual interface and unavailable through the virtual interface.

2. The device of claim 1, wherein the SR-IOV network adaptor is configured to operate utilizing single root input/output virtualization.

3. The device of claim 1, wherein the physical interface is to provide to the corresponding virtual machine a first set of capabilities to control the SR-IOV network adaptor.

4. The device of claim 3, wherein the capabilities include the ability to access at least one register in the device for controlling operation of at least the SR-IOV network adaptor.

5. The device of claim 3, wherein the virtual interface is to provide to the corresponding virtual machine a second set of capabilities that is a subset of the capabilities included in the first set.

6. The device of claim 5, wherein the super virtual interface is to provide to the corresponding virtual machine a third set of capabilities including the second set of capabilities and at least one additional capability included in the first set.

7. The device of claim 1, wherein the processing circuitry is to cause a virtual machine manager to be loaded into the memory circuitry.

8. The device of claim 7, wherein the virtual machine manager is to determine that a virtual machine is to be loaded into the memory circuitry.

9. The device of claim 8, wherein the virtual machine manager is to determine whether to load a physical interface, virtual interface or super virtual interface.

10. The device of claim 9, wherein in determining to load the super virtual interface the virtual machine manager is to determine at least one additional capability.

11. The device of claim 10, wherein in determining the at least one additional capability the virtual machine manager is to determine whether the virtual machine is allowed to access the at least one additional capability based on a security configuration.

12. A method for virtualized operation, comprising:
   determining that a virtual machine is to be loaded into memory circuitry in a device including at least a single root input/output virtualization (SR-IOV)-enabled network adaptor and an operating system loaded in the memory circuitry;
   determining at least one of a physical interface, a virtual interface or a super virtual interface to be loaded corresponding to the virtual machine based on a capability list received in the operating system from the SR-IOV network adaptor, the capability list including at least one capability available to the virtual machine through the super virtual interface and unavailable through the virtual interface, the physical interface, virtual interface or super virtual interface allowing the virtual machine to access the SR-IOV network adaptor; and
   causing a first virtual machine and a corresponding physical function driver having the physical interface to be loaded into the memory circuitry to control the SR-IOV network adaptor, a second virtual machine to be loaded into the memory circuitry as a virtual function driver for the virtual interface and a third virtual machine to be loaded into the memory circuitry as a super function driver for the super virtual interface.

13. The method of claim 12, wherein the physical interface provides to the corresponding virtual machine a first set of capabilities to control the SR-IOV network adaptor.

14. The method of claim 13, wherein the capabilities include the ability to access at least one register in the device for controlling operation of at least the SR-IOV network adaptor.

15. The method of claim 13, wherein the virtual interface provides to the corresponding virtual machine a second set of capabilities that is a subset of the capabilities included in the first set.

16. The method of claim 15, wherein the super virtual interface provides to the corresponding virtual machine a third set of capabilities including the second set of capabilities and at least one additional capability included in the first set.

17. The method of claim 16, further comprising:
   determining the at least one additional capability when it is determined that a super virtual interface is to be loaded.

18. The method of claim 17, further comprising:
   determining whether the virtual machine is allowed to access at least one additional capability based on a security configuration in the device.

19. At least one machine-readable storage medium having stored thereon, individually or in combination, instructions for virtualized operation that, when executed by one or more processors, cause the one or more processors to:
   determine that a virtual machine is to be loaded into memory circuitry in a device including at least a single root input/output virtualization (SR-IOV)-enabled network adaptor and an operating system loaded in the memory circuitry;
   determine at least one of a physical interface, a virtual interface or a super virtual interface to be loaded corresponding to the virtual machine based on a capability list received in the operating system from the SR-IOV network adaptor, the capability list including at least one capability available to the virtual machine through the super virtual interface and unavailable through the virtual interface, the physical interface, virtual interface or super virtual interface allowing the virtual machine to access the SR-IOV network adaptor; and
   cause a first virtual machine and a corresponding physical function driver having the physical interface to be loaded into the memory circuitry to control the SR-IOV network adaptor, a second virtual machine to be loaded into the memory circuitry as a virtual function driver for the virtual interface and a third virtual machine to be loaded into the memory circuitry as a super function driver for the super virtual interface.

20. The storage medium of claim 19, wherein the physical interface is to provide to the corresponding virtual machine a first set of capabilities to control the SR-IOV network adaptor.

21. The storage medium of claim 20, wherein the capabilities include the ability to access at least one register in the device for controlling operation of at least the SR-IOV network adaptor.

22. The storage medium of claim 20, wherein the virtual interface is to provide to the corresponding virtual machine a second set of capabilities that is a subset of the capabilities included in the first set.

23. The storage medium of claim 22, wherein the super virtual interface is to provide to the corresponding virtual machine a third set of capabilities including the second set of capabilities and at least one additional capability included in the first set.

24. The storage medium of claim 23, further comprising instructions that, when executed by one or more processors, cause the one or more processors to:
   determine the at least one additional capability when it is determined that a super virtual interface is to be loaded.

25. The storage medium of claim 24, further comprising instructions that, when executed by one or more processors, cause the one or more processors to:
   determine whether the virtual machine is allowed to access at least one additional capability based on a security configuration in the device.

26. A system for virtualized operation, comprising:
   means for determining that a virtual machine is to be loaded into memory circuitry in a device including at least a single root input/output virtualization (SR-IOV)-enabled network adaptor and an operating system loaded in the memory circuitry:
   means for determining at least one of a physical interface, a virtual interface or a super virtual interface to be loaded corresponding to the virtual machine based on a capability list received in the operating system from the SR-IOV network adaptor, the capability list including at least one capability available to the virtual machine through the super virtual interface and unavailable through the virtual interface, the physical interface, virtual interface or super virtual interface allowing the virtual machine to access the SR-IOV network adaptor; and means for causing a first virtual machine and a corresponding physical function driver having the physical interface to be loaded into the memory circuitry to control the SR-IOV network adaptor, a second virtual machine to be loaded into the memory circuitry as a virtual function driver for the virtual interface and a third virtual machine to be loaded into the memory circuitry as a super function driver for the super virtual interface.

27. The system of claim 26, wherein the physical interface is to provide to the corresponding virtual machine a first set of capabilities to control the SR-IOV network adaptor.

28. The system of claim 27, wherein the virtual interface is to provide to the corresponding virtual machine a second set of capabilities that is a subset of the capabilities included in the first set.

29. The system of claim 28, wherein the super virtual interface is to provide to the corresponding virtual machine a third set of capabilities including the second set of capabilities and at least one additional capability included in the first set.

* * * * *